Feb. 7, 1939. R. CHILTON 2,146,530
SPHERICALLY FORMED CONNECTING ROD END AND BEARING
Filed Nov. 3, 1937 3 Sheets-Sheet 1
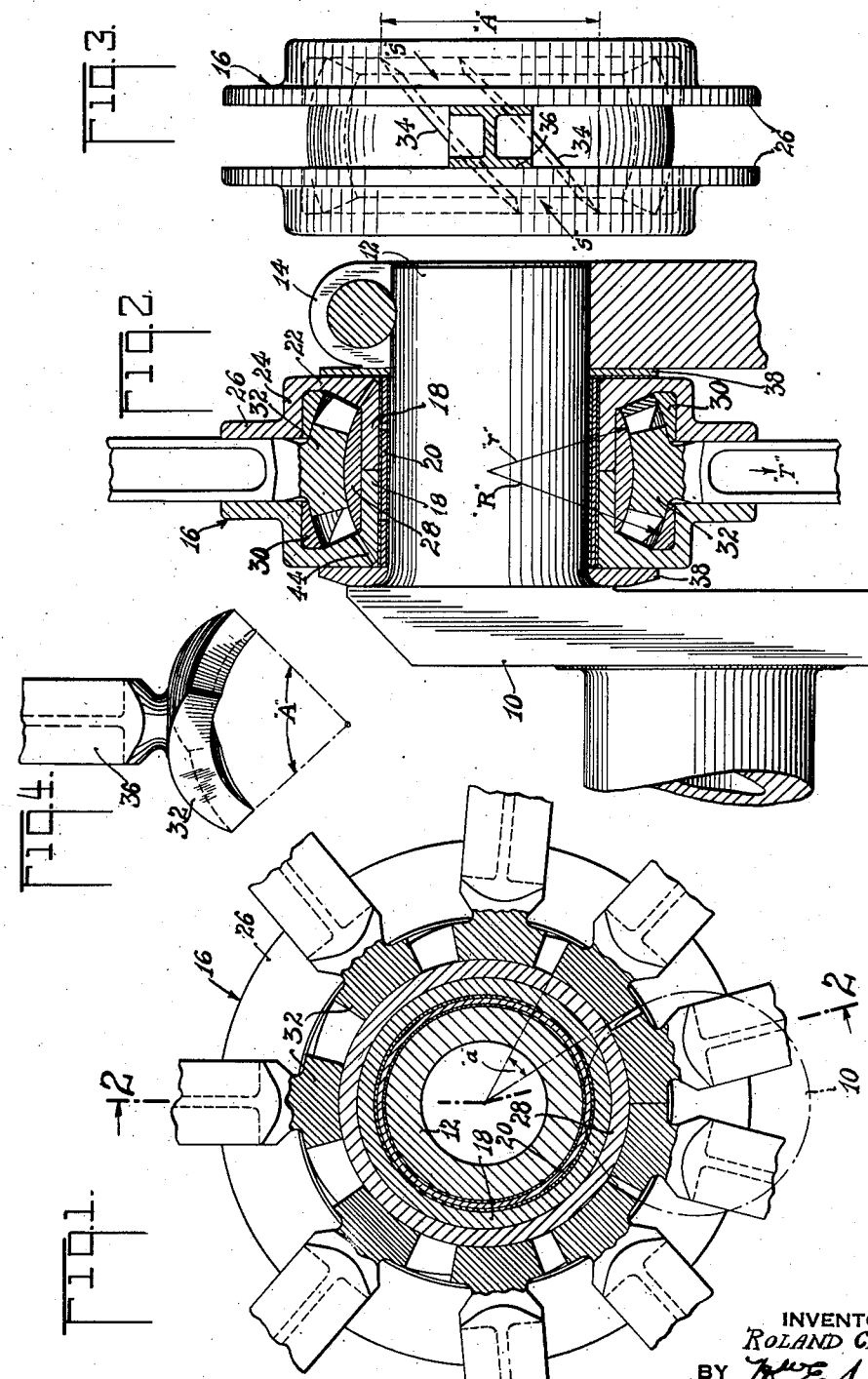
INVENTOR
ROLAND CHILTON
BY
ATTORNEY

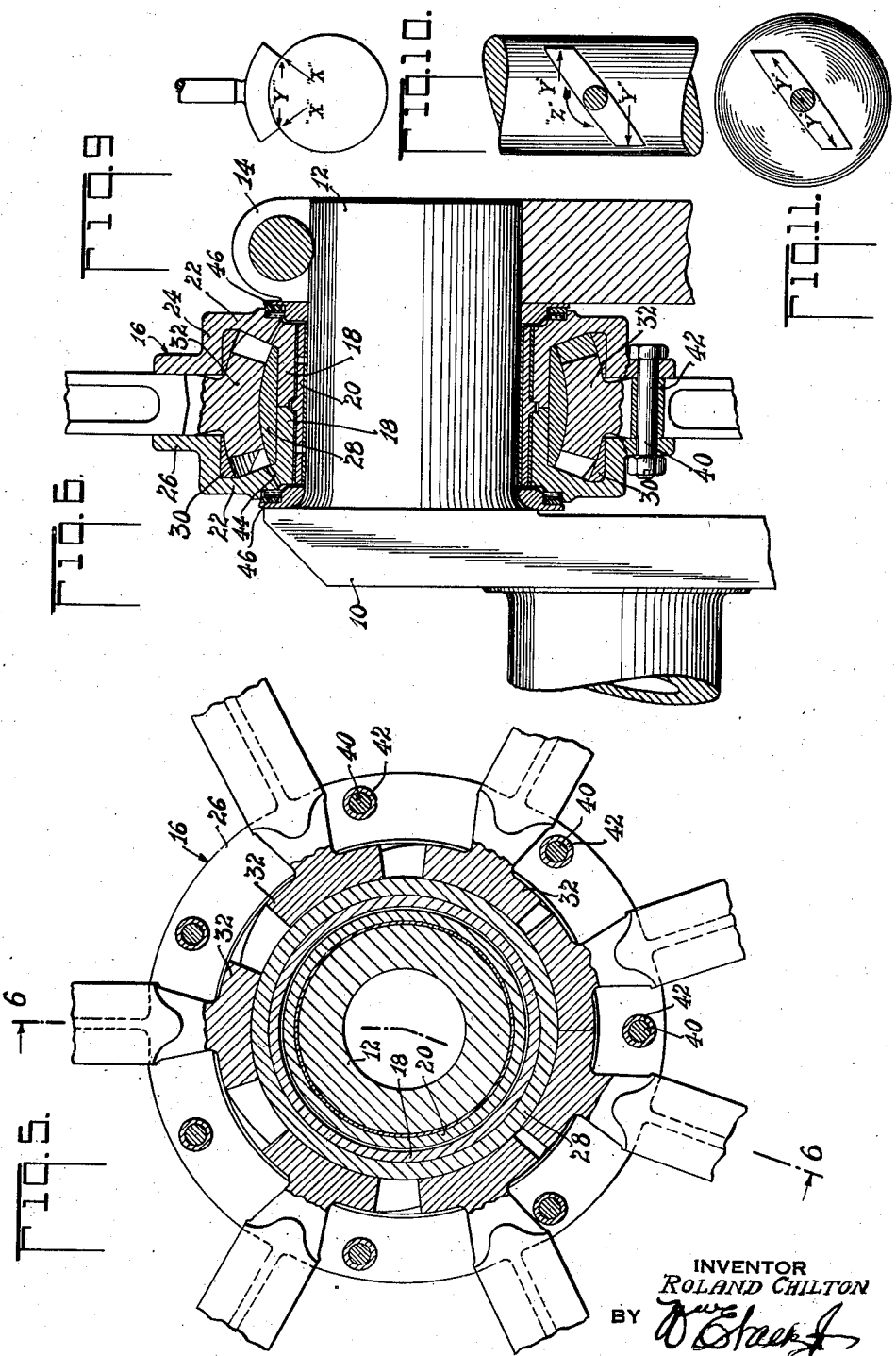

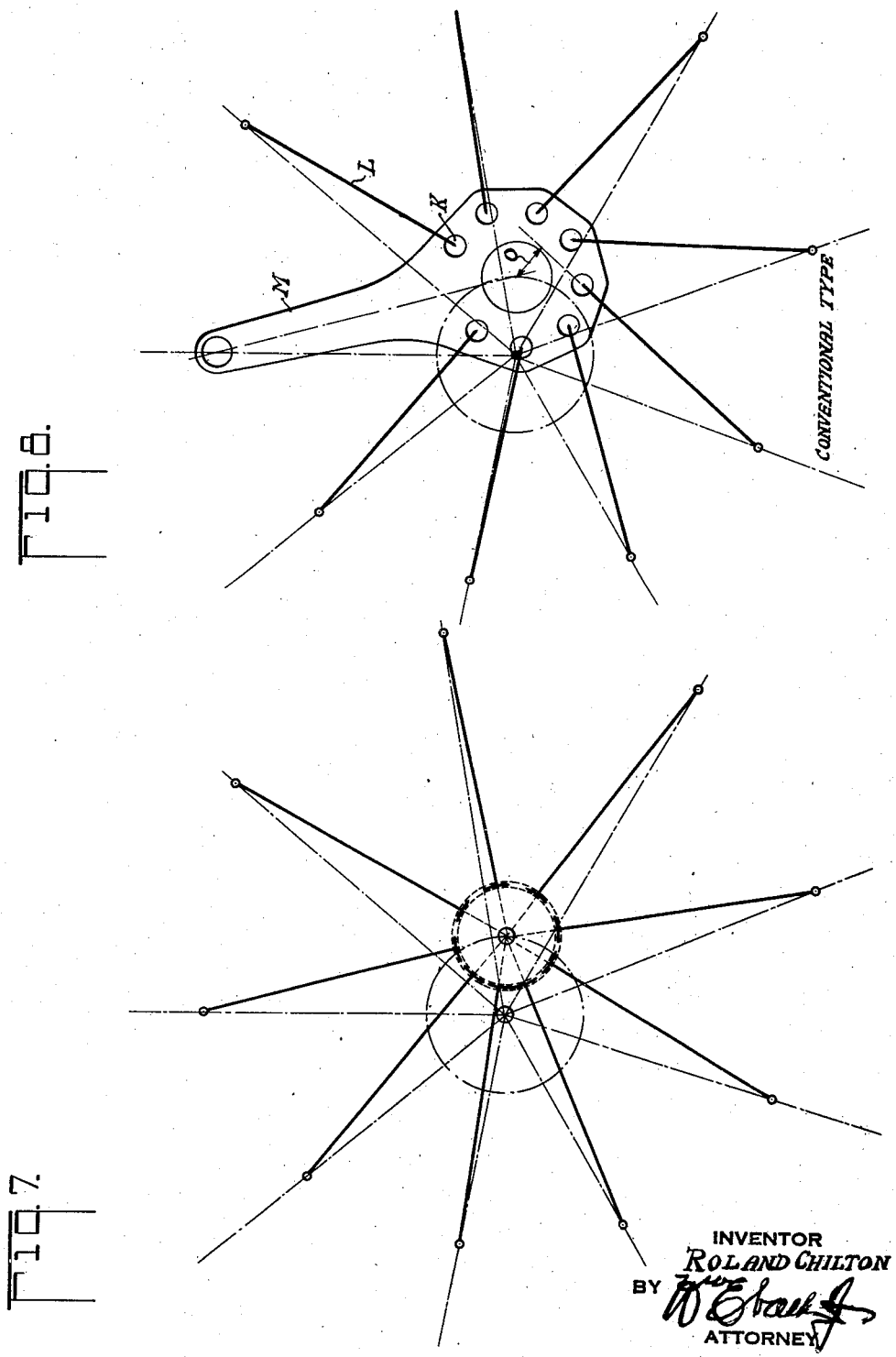

Patented Feb. 7, 1939

2,146,530

UNITED STATES PATENT OFFICE 2,146,530

SPHERICALLY FORMED CONNECTING ROD END AND BEARING

Roland Chilton, Ridgewood, N. J., assignor, by mesne assignments, to Wright Aeronautical Corporation, Paterson, N. J., a corporation of New York Application November 3, 1937, Serial No. 172,558

2 Claims. (Cl. 74—580)

This invention relates to improvements in connecting rods and particularly in connecting rods for radial engines, the embodiments illustrated being suitable for aircraft engine use. The invention will be understood by reading the annexed description with reference to the drawings in which similar numbers indicate similar parts and in which:

Fig. 1 is a fragmentary end view in part section through a 9-cylinder connecting rod assembly, Fig. 2 is a longitudinal section on the line 2—2 of Fig. 1, Fig. 3 is a fragmentary side view of the hub with one rod in section, Fig. 4 is a fragmentary side view of a slipper, Fig. 5 is a fragmentary end view in part section of a 7-cylinder connecting rod assembly, Fig. 6 is a section on the line 6—6 of Fig. 5, Fig. 7 is a diagram of a slipper rod organization, Fig. 8 is a diagram of a conventional rod assembly, and Figs. 9, 10 and 11 are diagrams showing the fundamental difference in the force reactions on cylindrical and spherical slippers respectively.

The conventional arrangement (see Fig. 8) comprises a master rod M serving the piston of one cylinder and having knuckle pins K engaged by link rods L serving the pistons of the remaining cylinders. Due to the angularity of the master rod, the knuckle pins follow elliptical rather than circular paths and this distortion from true motion results in unsymmetrical motion and inertia forces on the various pistons giving rise to unbalanced forces which cannot be counterbalanced by the conventional counterweights and which also produces irregularities in the torque curve. With this conventional system, the thrust axis of the link rods becomes substantially offset from the center of the crankpin as indicated in O in Fig. 8, introducing bending moments in the shank of the master rod and increasing the maximum angularity of the link rods and therefore increasing the piston side pressures.

It is known that, by a slipper type disposition (as indicated in Fig. 7) symmetrical motion of all the pistons is obtained and the thrust line of each rod always acts radially through the center of the crankpin which construction gives a kinetic system which may be completely balanced with an appropriate counterweight. Attempts to take advantage of these very desirable characteristics of slipper type rods have been abandoned in practice because of the mechanical difficulties which it is one of the prime objects of this invention to overcome as follows:

By reference to Fig. 1, which shows the inner ends of the slipper rods of a 9-cylinder engine, it will be seen that the arc of embracement (a) which may be subtended by the individual slippers, in any transverse sectional plane, is limited by the clearance spaces needed between the slippers for their relative motion. This arc of embrace in the case of a 9-cylinder engine is so short as to result in jamming should the conditions shown in Fig. 1 obtain for a rectangular slipper face. Accordingly, in the prior art, slippers have been disposed diagonally, at an angle to the crankpin axis, so as to include a larger total arc of embracement from end to end of the slipper. In this prior art, however, the slippers have contacted cylindrical bearing rings or guides and it is a fundamental of such a construction that it is impossible for the extended end of the slippers to carry bearing loads because any bearing reaction has a rotational component about the axis of the rod, so that the ends of the slippers tend to leave the guiding surfaces, so that the load can only be taken immediately in the vicinity of the axis of the rod. This is illustrated in the diagrams of Figs. 9 and 10, from which it is obvious that reactions at X have offset components Y acting in opposite directions and requiring a counterbalancing torque, in the direction Z around the axis of the rod, in order to permit the extended portions of the slipper to carry any load. In practice, no means have been found to set up any adequate restraint against such minute rotation as will unload slipper ends and concentrate the entire load on a small area about the rod axis. Accordingly, the prime feature of the present invention consists in making the slipper guiding or bearing surfaces of spherical conformation as diagrammed in Fig. 11 whereby the reactions Y act in a line along the angular length of the slipper and therefore have no rotational component on the rod. The latter could be turned into any position and still perfectly fit the spherical journal surface.

It should be clear that the conventional slipper rod end comprises a saddle fitted to a cylindrical element whereby any rotation of the rod about its end axis will destroy the fit, and that when the slipper is made angular or helical, such turning tendency is immediately set up and so prevents the ends of the slipper from taking any useful load. On the other hand, with the spherical conformation of the present invention, there are no such turning moments while, at the same time, the diagonal slipper still fits the sphere even if rotated out of its normal position.

Referring now to Figs. 1 and 2, 10 designates a conventional crankshaft having the usual crankpin 12 to which is demountably attached a crankcheek 14 in the usual way. The structure of this invention comprises two side rings indicated in general at 16 and each comprising an inner cylindrical portion 18, in which is fitted a bearing sleeve 20; side walls 22; an outer cylindrical portion 24, and a stiffening flange 26. Fitted over the inner cylindrical portions 18 is an inner slipper bearing ring 28 having a spherical exterior as indicated by the radius r. Fitted within the outer cylindrical proportions 24 are outer slipper guide rings 30, having internal spherical faces of radius R. Arcuate slipper elements 32 are formed as spherical elements to engage respectively the spherical surfaces of 28 and 30, these slippers being elongated in plan form and assembled in angular relation as indicated at 34 (Fig. 3) and as shown in detail end view in Fig. 4. It will be seen that, by this angular or helical disposition, the total arc or length of embracement is that indicated by letter A in Figs. 3 and 4.

The shank of the rod is conveniently made of H section as shown, providing flat surfaces 36 engaged between the opposed flat surfaces of the flanges 26 to locate the rod against rotation about its own axis. It is here emphasized that this is a mere locating function and that no reactions from the operating loads fall upon the guiding faces of the flange and rod since, with the spherical formation of this invention, all twisting forces on the rod are absent. This is in direct opposition to the conventional cylindrical slipper construction wherein it would only be possible to carry the rod loads over the length of the slippers by having the guiding surfaces 36 sustain the resulting high twisting loads. This is impracticable because of the resultant jamming and friction effects at the guiding surfaces and also because it would be impossible to machine the parts to sufficient accuracy.

In the specific construction of Fig. 2 it is contemplated that the bushing 20 may be floating, that is to say, free to turn with respect to both the crankpin 12 and the rings 16 which are thus free to float relative to each other. It will be seen that, under the tension forces produced in the rods by inertia, the slipper loads are against the outer rings 30 which have angularly disposed bearing surfaces and, accordingly, exert some separating components on the rings 16. These may be resisted (in this floating embodiment) by suitable thrust rings 38.

In Figs. 5 and 6, wherein similar parts have been given the same reference numbers, there is shown a slight modification suitable for a 7-cylinder engine wherein the separating tendency of the side rings 16 is taken by through bolts 40 having suitable spacing sleeves 42 whereby the side rings are rigidly clamped together. It happens that there is insufficient space between adjacent rods in a 9-cylinder engine to permit the necessary articulating swing with through bolts such as just described.

Lubrication of the slipper faces is preferably accomplished by holes 44 through which lubricant leakage from the ends of the main bearing sleeve 20 is conducted to the slipper faces. Suitable spring oil seals 46 may be provided in the embodiments of Figs. 5 and 6 to prevent loss of this oil. This sealing function is effected automatically by the thrust washers 38 of the embodiment described in connection with Figs. 1 and 2.

It will now be clear that, by merely forming the helical or angularly disposed slippers to have spherical engaging surfaces with the ring members, uniform load distribution over the entire length of the slipper face is insured, and that the twisting reactions on the rod, which prevent any load being carried at the end of the angulated cylindrical slippers of the prior art, have been completely eliminated.

There is a secondary advantage to the spherical conformation in that there are operating deflections in an engine tending to displace the crankpin axis from the normal rectangular relationship with the plane of the rods and the spherical conformation also provides a self-aligning feature for this distortion. This is not itself the primary function of the spherical conformation of the present invention which is, as iterated above, to permit the axial loads of the road to be absorbed over the whole length of the slipper faces, including the end portions thereof, without introducing the twisting action which has prevented the ends of angulated cylindrical slippers of the prior art, from having any useful load carrying function.

To still further emphasize this feature, the tension condition illustrated by the arrow T in Fig. 2 may be referred to. Under these conditions, it will be obvious that the offset ends of the slipper are bearing against the sloping slipper faces of the outer rings 30, but, as the slopes are spherical, the net reactions must pass through the center of sphericity, as indicated by the arrows S in the plan view of Fig. 3, whereby these reactions induce no turning moment. It should be obvious that if the rings 30 were made cylindrical as in the prior art, these reactions S would act in a direction parallel to the axis of the crankpin but at offset ends of the slipper which would promptly be twisted out of the groove unless some heavy restraining force could be introduced to prevent this result. No practical restraining means has been developed in the art.

An additional object and advantage of the invention resides in the geometric simplicity of the spherical construction. The relatively complicated form of a conventional master rod involves expensive machining and undesirable changes in section which induce localized stresses. In the present construction on the contrary, the main side members 16 are of un-interrupted circular section, involving nothing but turning and grinding operations, while the accurate finishing of the slippers may be affected by simple spherical grinding with the rod rotating about its longitudinal axis, a construction wherein a high degree of accuracy may be maintained by economical production methods.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A connecting rod assembly for mounting upon a crankpin comprising similar opposed elements journalled on the pin and having opposed annular substantially rectangular cross-section grooves, a ring of bearing material assembled between said elements lying in contact with the radially inner surfaces of the grooves of the opposed elements, the exposed surface of the ring being spherical in form, opposed similar rings of bearing material fitted to the radially outer surfaces of the grooves of respective opposed elements, the inwardly facing exposed surfaces of the latter rings being spherically formed and concentric with the spherical surface of the first ring, and connecting rods each having diagonally disposed slippers assembled in the grooves of said elements, the inner and outer surfaces of the slippers being spherically formed in complement to, and in bearing engagement with, respective spherically surface rings in said grooves.

2. A connecting rod bearing assembly for a crankpin, comprising opposed elements on the crankpin having opposed annular grooves, said elements including means defining in said grooves concentric spherically formed bearing tracks, the track on the outwardly facing groove face being convexly spherical in form and the track on the inwardly facing groove face being concavely spherical in form; and connecting rods each having a spherically segmental slipper including an inner spherically concave face complementary to and engaging the convex track and an outer spherically convex face complementary to and engaging the concave track, and a rod shank rigid with each slipper extending radially outwardly therefrom between the opposed elements.

ROLAND CHILTON.